H. CLYMO.
Harvester Rake.
No. 54,298.  Patented May 1, 1866.
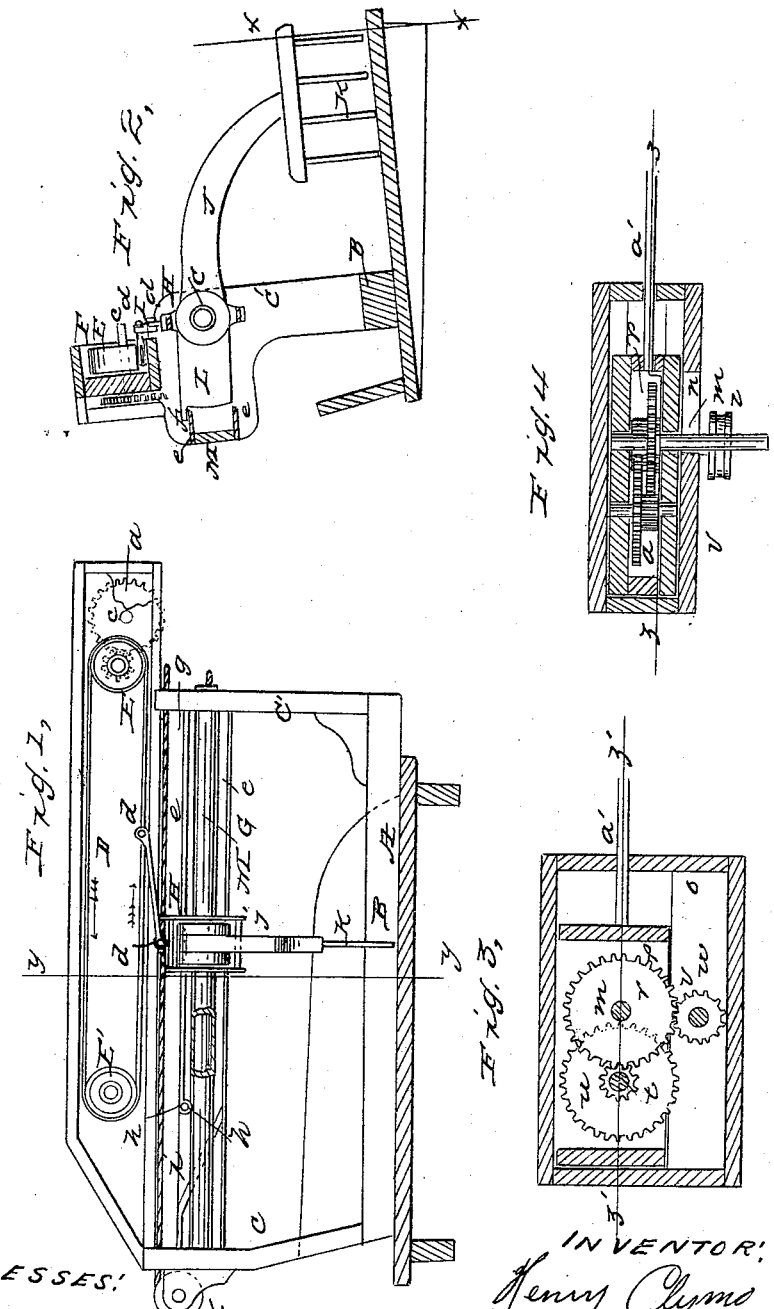
WITNESSES:  INVENTOR:

UNITED STATES PATENT OFFICE.

HENRY CLYMO, OF GALENA, ILLINOIS.

IMPROVEMENT IN HARVESTER-RAKES.

Specification forming part of Letters Patent No. 54,298, dated May 1, 1866.

*To all whom it may concern:*

Be it known that I, HENRY CLYMO, of Galena, in the county of Jo Daviess and State of Illinois, have invented a new and Improved Raking Attachment for Harvesters; and I do hereby declare that the following is a full, clear, and exact description thereof, which will enable others skilled in the art to make and use the same, reference being had to the accompanying drawings, forming a part of this specification, in which—

Figure 1 is a front or face view of my invention, the platform of the harvester and a portion of the rake being in section, as indicated by the line $x\ x$, Fig. 2; Fig. 2, a transverse vertical section of the same, taken in the line $y\ y$, Fig. 1; Fig. 3, a detached section of a portion of the same, taken in the line $z\ z$, Fig. 4; Fig. 4, a section of Fig. 3, taken in the line $z'\ z'$.

Similar letters of reference indicate like parts.

This invention relates to a new and improved automatic raking device for harvesters, whereby the cut grain may be raked from the platform in the most efficient manner and without in the least interfering with the cutting mechanism or any of the working parts of the harvester.

A represents the platform of a harvester or reaper, and B is a bar or beam, of hard wood, which is securely bolted or otherwise attached to the platform at its rear part and parallel with the sickle or front edge of the platform. This bar B projects a trifle beyond the discharge end of the platform A, and C C′ are two uprights, which are secured to the ends of the bar B, and have a horizontal hollow bar or oblong box, D, secured on their upper ends, the front side of said bar or box being open. Within this bar or box there are two pulleys, E E′, over which an endless band, F, works, one of said pulleys, E, having motion communicated to it by means of gearing $a\ b$, power being applied to the shaft $c$ of the gear $b$ from the driving-wheel of the machine through any suitable means.

G represents a horizontal tube, which is fitted in the upper parts of the uprights C C′, just below the hollow bar or box D, and on this tube G there is fitted a slide, H, made in yoke form, and connected, by an arm, I, at its upper end, to the band F, said arm being connected, by pivots $d$, to both the band and the slide, as shown in Fig. 1.

J represents the rake-arm, which is fitted loosely on the tube G, within the slide H, said rake-arm being allowed to turn freely on the tube, and also to slide freely thereon. The rake-arm is curved downward over the platform A, and has the rake K attached to it, while the opposite end, at the rear side of the tube G, is loaded with a weight, L, the gravity of which, when allowed, keeps the rake K elevated above the platform.

At the rear sides of the upper parts of the uprights C C′ there is secured a horizontal bar, M, which has a metal strip, $e$, secured to its upper and lower edges, said strips projecting forward of the bar M and serving as guides for the rake-arm J, the weight L being provided with a projecting lip, $f$, which rests on said strips $e$. The upper strip, $e$, has a notch or recess, $g$, made in it over the discharge end of the platform, (see Fig. 1,) and to the opposite end of said upper strip there is attached, by a joint, $h$, a flap, $i$, underneath which there is an inclined plane, $j$, the lower end of the latter being in contact with the upper surface of the lower strip, $e$.

The operation of this portion of the invention is as follows: The endless band F moves in the direction indicated by the arrow 1, and when the arm I is at the lower part of the band the lip $f$ of the weight L rests upon the upper strip $e$, and the rake K is depressed and moves toward the discharge end of the platform A, raking the cut grain therefrom, and as the rake nearly reaches said end of the platform the lip $f$ passes through the notch $e$, dropping before the lower strip $e$, the rake, of course, rising; and the arm I having passed around the pulley E, the elevated rake returns back toward the outer end of the platform, the elevation of the rake not permitting the latter to interfere with the cut grain falling upon the platform; and when the rake nearly reaches the termination of said movement the lip $f$ passes up the inclined plane $j$ and raises the flap $j$ and passes upon the upper strip $e$, while the end of the arm I that is attached to the band F passes around the pulley E′, and the rake K will consequently pass over the platform in a depressed state, as before, and rake the cut grain therefrom.

By this arrangement it will be seen that the rake is operated from an endless band having a continuous motion in one direction; but a reciprocating belt may be used, as shown in red, Fig. 1, said belt passing around a pulley, $k$, on the upright C, through the tube G, and around a pulley, $l$, on a shaft, $m$, which passes through an oblong slot, $n'$, into a box, $o$, attached to the upright $C'$, the shaft $m$ passing through a box, $p$, in $o$, the box $p$ being allowed to slide to a certain extent in the box $o$.

On the shaft $m$, within the box $p$, there is keyed a toothed wheel, $r$, which gears into a pinion, $s$, on a shaft, $t$, in box $p$, said shaft $t$ also having a toothed wheel, $r$, upon it, (see Figs. 3 and 4) about of the same diameter as the wheel $r$.

Through the lower part of the box $o$ a shaft, $v$, passes transversely, said shaft having a pinion, $w$, before it, into either of which the wheels $r\ u$ may be made to gear by shoving the sliding box $p$. This may be done by means of a rod, $a'$, attached to box $p$, and said rod may be operated at the proper time from the driving-wheel of the machine by any suitable means.

When the rake moves over the platform to rake the cut grain therefrom the wheel $u$ is made to gear into the pinion $w$, and during the return movement of the rake the wheel $r$ gears into $w$, and it will be seen that, in consequence of the variation in the size of the gears, the working movement of the rake is much quicker than its return movement, and it is desirable that it should be so, in order that the rake, when performing its work, may not interfere with the falling of the cut grain upon the platform.

Having thus described my invention, what I claim as new, and desire to secure by Letters Patent, is—

1. The loaded or weighted rake-arm J, placed on a tube or rod, G, so as to work or turn thereon in a vertical plane, and also to slide thereon horizontally, in connection with an endless band, guide-strips $e\ e$, provided, respectively, with a notch, flap, and inclined plane, all arranged to operate substantially in the manner as and for the purpose set forth.

2. The adjustable gears $r\ u$, in combination with the fixed gear $w$, for operating the endless band or giving a reciprocating motion thereto, as set forth.

HENRY CLYMO.

Witnesses:
 EDWD. D. KITTOE,
 HENRY MARFIELD.